United States Patent
Banerjee et al.

(10) Patent No.: US 7,321,931 B2
(45) Date of Patent: Jan. 22, 2008

(54) TIME CONTROLLED NETWORK USE

(75) Inventors: Dwip N. Banerjee, Austin, TX (US);
Kumar Ravi, Cedar Park, TX (US);
Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 10/327,438

(22) Filed: Dec. 20, 2002

(65) Prior Publication Data

US 2004/0122947 A1    Jun. 24, 2004

(51) Int. Cl.
*G06F 15/173* (2006.01)
(52) U.S. Cl. .................. 709/224; 709/217; 709/218
(58) Field of Classification Search ............. 709/225, 709/218, 217, 224
See application file for complete search history.

(56) References Cited

U.S. PATENT DOCUMENTS

| | | | | |
|---|---|---|---|---|
| 6,035,404 A | * | 3/2000 | Zhao | ............................ 726/6 |
| 6,182,122 B1 | * | 1/2001 | Berstis | ........................ 709/217 |
| 6,381,637 B1 | * | 4/2002 | Kamada | ...................... 709/218 |
| 6,564,251 B2 | * | 5/2003 | Katariya et al. | ............. 709/214 |
| 6,795,856 B1 | * | 9/2004 | Bunch | ......................... 709/224 |
| 2003/0051161 A1 | * | 3/2003 | Smith et al. | ................. 713/201 |

OTHER PUBLICATIONS http://uptowncity.com/tech/tips/web_tips/refresh.htm, date unknown.
http://www.sira.com/products/onlinefaqs.htm, date unknown.

* cited by examiner

*Primary Examiner*—David Wiley
*Assistant Examiner*—Kyung H Shin
(74) *Attorney, Agent, or Firm*—Matthew W. Baca; Amy J. Pattillo

(57) ABSTRACT

A method, system, and program for time controlled network use are provided. A time controller counts an amount of time utilized by a particular user in accessing at least one web page via a network. Then, in response to the counted amount of time reaching at least one time limit for the particular user, the time controller initiates an action to control further accesses via the network by the particular user, such that an amount of time the particular user spends making network accesses is limited.

15 Claims, 8 Drawing Sheets

| BOOKMARKED PAGES DATABASE 66 | | | |
|---|---|---|---|
| ADDRESS/CONTENT | SEQUENCE? | USER TIME LIMIT | WORK RELATED? |
| YAHOO.COM (SITE) | A1 | 5 MINUTES - SEQUENCE | DEPENDS |
| CNN.COM (SITE) | A2 | 10 MINUTES - SEQUENCE 20% OF TOTAL DAILY LIMIT | NO |
| PERSONAL E-MAIL ACCOUNT | A3 | 20 MINUTES - SEQUENCE 30% OF TOTAL DAILY LIMIT | NO |
| IBM.COM/NEWS | A4 | 5 MINUTES - SEQUENCE | YES |
| GOOGLE.COM | - | COUNT TIME | DEPENDS |
| SOFTWARE FOCUS | - | COUNT TIME | YES |
| CLOTHING RETAILER | - | 5% OF WEEKLY LIMIT | NO |

74

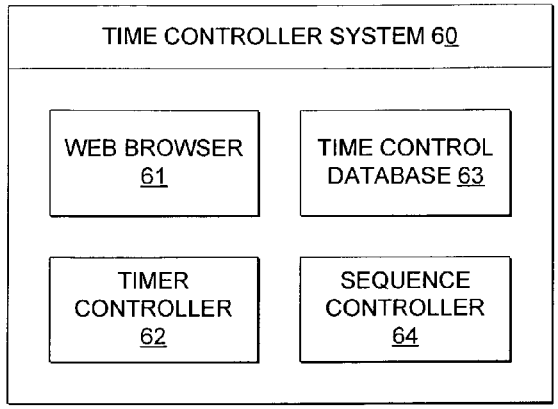

*FIGURE 3*

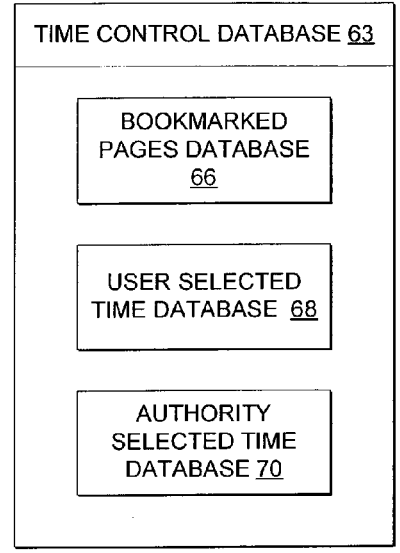

*FIGURE 4*

| BOOKMARKED PAGES DATABASE 66 ||||
| --- | --- | --- | --- |
| ADDRESS/CONTENT | SEQUENCE? | USER TIME LIMIT | WORK RELATED? |
| YAHOO.COM (SITE) | A1 | 5 MINUTES - SEQUENCE | DEPENDS |
| CNN.COM (SITE) | A2 | 10 MINUTES - SEQUENCE 20% OF TOTAL DAILY LIMIT | NO |
| PERSONAL E-MAIL ACCOUNT | A3 | 20 MINUTES - SEQUENCE 30% OF TOTAL DAILY LIMIT | NO |
| IBM.COM/NEWS | A4 | 5 MINUTES - SEQUENCE | YES |
| GOOGLE.COM | - | COUNT TIME | DEPENDS |
| SOFTWARE FOCUS | - | COUNT TIME | YES |
| CLOTHING RETAILER | - | 5% OF WEEKLY LIMIT | NO |

*FIGURE 5*

| USER SELECTED TIME DATABASE 68 | | | |
|---|---|---|---|
| TIME SETTING | TYPE | TIME LIMIT | ACTION |
| WEEK | SEQUENCE | 200 MINUTES | WARNING |
| WEEK | PERSONAL | 400 MINUTES | CLOSE |
| DAY | NEWS | 30 MINUTES | OPTION TO ADD |
| DAY | SEQUENCE | 40 MINUTES | WARNING |
| DAY | PERSONAL | 60 MINUTES | CLOSE |
| SITE | ALL | 15 MINUTES | WARNING |

*FIGURE 6*

| AUTHORITY SELECTED TIME DATABASE 70 | | | |
|---|---|---|---|
| TIME SETTING | TYPE | TIME LIMIT | ACTION |
| WEEK | NEWS | 60 MINUTES | WARNING |
| WEEK | PERSONAL | 160 MINUTES | BLOCK |

*FIGURE 7*

TIME CONTROLLED NETWORK USE

BACKGROUND OF THE INVENTION

1. Technical Field

The present invention relates in general to network systems and, in particular, to accessing web pages via a network. Still more particularly, the present invention relates to time managed access to web pages via a network.

2. Description of the Related Art

The Internet provides access to a vast array of web sites, many containing information updated daily. Searching through the vast array of web sites, also known as web surfing, is becoming a daily habit of more and more users.

With this daily habit of web surfing, a user may visit the same web sites each day. For example, a user may visit a news website and a sports website each day. Many web browsers include a feature for setting bookmarks to selected web sites, such that the bookmark can later be selected to return to the bookmarked web site. Thus, a user may get in the habit of periodically visiting a selection of bookmarked web sites.

While access to daily news, research, and other information is advantageous, there are also detriments to web surfing. A common detriment to web surfing is that because web sites provide so much information, when a user accesses a particular web page to look-up specific information, the user can get hooked into reading all the other information on the site including that web page, thus spending more time surfing than intended or available.

Another detriment to web surfing is that because there are so many web sites available and many web sites contain advertising grabbing the attention of user, a user may start surfing for a specific purpose and get off track following advertisements, again spending more time surfing than intended or available. Further, while many companies find it advantageous to provide employees with Internet access for research and other job-related functions, it is detrimental to companies if employees are using a large amount of time surfing web sites of little or no relevance to the employee's job.

In view of the foregoing, it would be advantageous to provide a method, system, and program for time controlled access to a network. In particular, it would be advantageous to limit the amount of time a user spends at a particular web site or page or surfing through multiple web sites. Further, it would be advantageous to provide time controlled web surfing where both user specified and authority specified time limits control the amount of time a user spends surfing the web for non-job related information.

SUMMARY OF THE INVENTION

In view of the foregoing, it is therefore an object of the present invention to provide improved network systems.

It is another object of the present invention to provide a method, system and program for accessing web pages via a network.

It is yet another object of the present invention to provide a method, system and program for time managed access to web pages via a network.

According to one aspect of the present invention, a time controller counts an amount of time utilized by a particular user in accessing at least one web page via a network. Then, in response to the counted amount of time reaching at least one time limit for the particular user, the time controller initiates an action to control further accesses via the network by the particular user, such that an amount of time the particular user spends making network accesses is limited.

According to another aspect of the present invention, a time attribute associated with a web site is received. The access time for the web site is monitored. The time attribute is compared with the access time. Access to the web site is enabled until the access time exceeds the time attribute. Further, responsive to detecting the access time exceeding the time attribute, an indicator is provided to indicate that an allowed time is exceeded.

Time attributes may be set by a user and an authority. Further, time attributes may be set with the web site, where the web site is bookmarked. Time attributes for each page of a web sites may be received. In addition, web sites may be grouped together, where a separate time attributed is received for each group of web sites. Further, a web page of a web site may be associated with a particular category where a search engine is used to establish that a web page of the site matches the category and then the time attribute received for the page of the web site is the time attribute for the associated category.

In addition to providing an indicator when the access time exceeds the time attribute, a next web site may be automatically requested. A user may also request to ignore the indicator that the access time exceeds the time attribute. Responsive to this user request, the indicator is removed.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a block diagram of a time controller system in accordance with the method, system, and program of the present invention;

FIG. 4 depicts a block diagram of a time control database in accordance with the method, system, and program of the present invention;

FIG. 5 depicts a block diagram of a bookmarked pages database in accordance with the method system, and program of the present invention;

FIG. 6 depicts a block diagram of a user selected time database in accordance with the method, system, and program of the present invention;

FIG. 7 depicts a block diagram of an authority selected time database in accordance with the method, system, and program of the present invention;

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Further, the computing system may be a special function system, such as a gaming system. Therefore, in general, the present invention is preferably executed in a computer system that performs computing tasks such as manipulating data in storage that is accessible to the computer system. In addition, the computer system preferably includes at least one output device and at least one input device.

Figure 1:
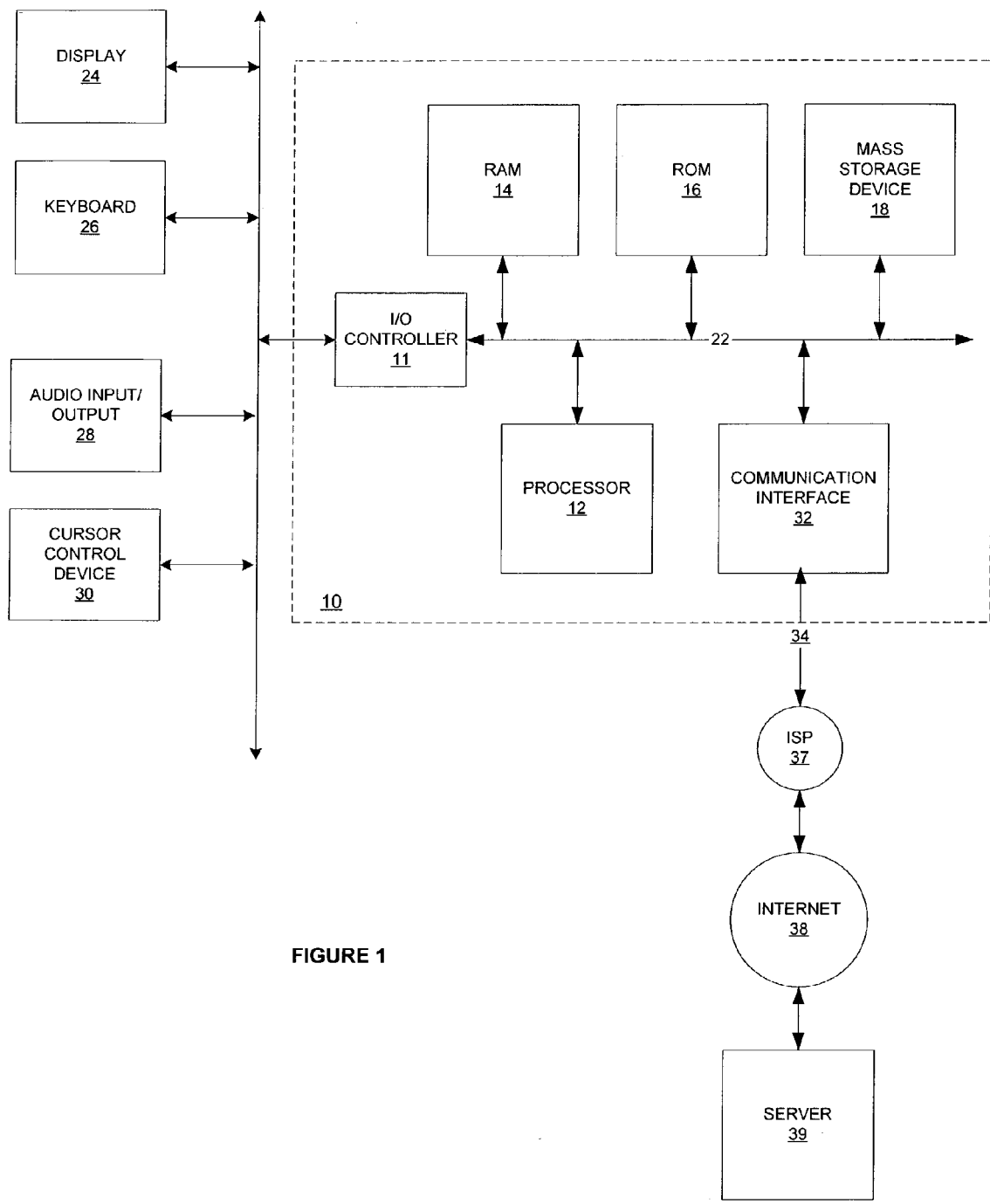
FIG. 1 depicts a block diagram of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 10, 11, 12, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10, connected to an input/output (I/O) controller 11 coupled to bus 22. For example, an audio input 28 is attached to I/O controller 11 for controlling audio input through a microphone or other sound or lip motion capturing device and for controlling audio output through a speaker or other audio projection device. A display 24 is also attached to I/O controller 11 for providing visual, tactile or other graphical representation formats. A keyboard 26 and cursor control device 30, such as a mouse, trackball, or cursor direction keys, are coupled to I/O controller 11 as interfaces for user inputs to computer system 10. In alternate embodiments of the present invention, additional input and output peripheral components may be added.

Figure 2:
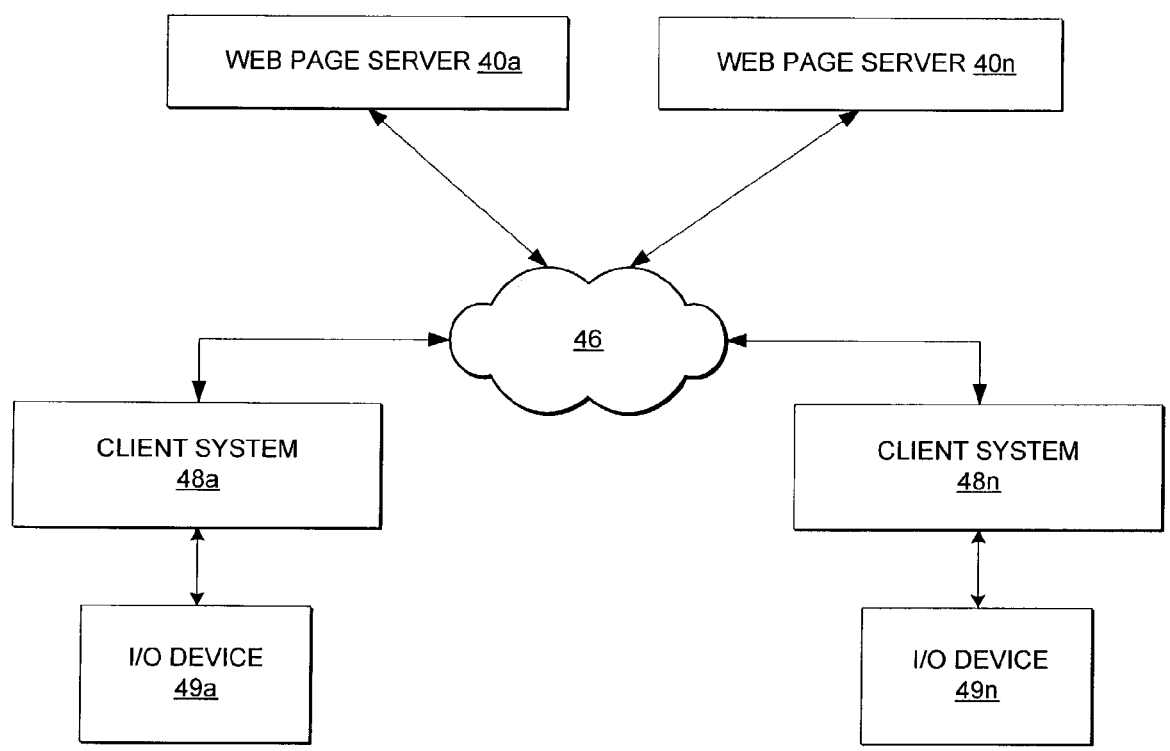
FIG. 2 depicts a simplified block diagram of a client/server environment for facilitating time controlled web surfing in accordance with the method, system, and program of the present invention.

With reference now to FIG. 2, a simplified block diagram depicts a client/server environment for facilitating time controlled web surfing in accordance with the method, system, and program of the present invention. The client/server environment is implemented within many network architectures. For example, the architecture of the World Wide Web (the Web) follows a traditional client/server model environment.

The terms "client" and "server" are used to refer to a computer's general role as a requester of data (the client) or provider of data (the server). In the Web environment, web browsers such as Netscape Navigator typically reside on client systems 48a-48n and render Web documents (pages) served by at least one of web page servers 40a-40n. Additionally, each of client systems 48a-48n and web page servers 40a-40n may function as both a "client" and a "server" and may be implemented utilizing a computer system such as computer system 10 of FIG. 1. Further, while the present invention is described with emphasis upon web page servers 40a-40n serving web pages, the present invention may also be performed by client systems 48a-48n engaged in peer-to-peer network communications via a network 46.

The Web may refer to the total set of interlinked hypertext documents residing on servers all around the world. Network 46, such as the Internet, provides an infrastructure for transmitting these hypertext documents between client systems 48a-48n and web page servers 40a-40n. Documents (pages) on the Web may be written in multiple languages, such as Hypertext Markup Language (HTML) or Extensible Markup Language (XML), and identified by Uniform Resource Indicators (URIs) that specify the particular web page server from among web page servers 40a-40n and pathname by which a file can be accessed, and then transmitted from the particular web page server to an end user utilizing a protocol such as Hypertext Transfer Protocol (HTTP). Web pages may further include text, graphic images, movie files, and sounds, as well as Java applets and other small embedded software programs that execute when the user activates them by clicking on a link. In particular, multiple web pages may be linked together to form a web site. The web site is typically accessed through an organizational front web page that provides a directory to searching the rest of the web pages connected to the web site. While network 46 is described with reference to the Internet, network 46 may also operate within an intranet or other available networks.

A user or an authority enters time limits for viewing web pages via one of I/O devices 49a-49n for storage in a time control database located at one of client systems 48a-48n or a server system accessible via network 46. In addition, a user enters a request to access a particular web page or sequence of web pages via one of I/O devices 49a-49n.

A time controller is located at the requesting client system or at a server enabled to monitor network access by the requesting client system. Upon detection of a request to access a particular web page, the time controller calculates an amount of time available for viewing the particular web page at the requesting client system based on the time limits set for the particular web page by the user and an authority. Then, the time controller monitors the amount of time a user is enabled to view the particular web page via one of I/O devices 49a-49n. When the time expires for viewing the particular web page, then the time controller may automatically close the web page from display or may adjust the display in some way to indicate the expiration. In particular, an authority may include an employer, a parent, and Internet Service Provider (ISP), or other individual or group allowed to regulate the time a user spends accessing a network.

The time controller may alert the user as to the amount of time remaining for viewing the web page. For example, a timer may be displayed showing the amount of time remaining for viewing the particular web page. Alternatively, the time controller may provide a periodic alert to the user as to the amount of time remaining for viewing the particular web page.

If a user chooses to view a new web page before the time for viewing a current web page has expired, the time controller preferably monitors the unused time. Unused time may be carried over into the time allotted for viewing the new web page or another web page.

Referring now to FIG. 3, a block diagram illustrates a time controller system in accordance with the method, system, and program of the present invention. A time controller system 60 controls monitoring the amount of time a user spends viewing web pages and limiting viewing to time limits set by the user. Time controller system 60 may reside in a single system or across multiple systems where those systems include, but are not limited to, a client system, a server system providing network access to the client system, or a server system accessible to a client system via a network.

As illustrated, a time controller system 60 includes a web browser 61. Web browser 61 controls the communication between the client system and a web page server and controls the display and interaction with a web page accessed at the client system from the web page server. While in the present invention the time controller system is depicted as incorporating web browser 61, in alternate embodiments, web browser 61 may incorporate the time controller functions.

A timer controller 62, depicted in time controller system 60, calculates time allowed for a user to view web pages based on the time limits set by the user or an authority in time control database 63. Timer controller 62 also monitors the actual time a user views web pages and informs the user of time limitations on viewing. Time limits may be set for a specific web page, for a sequence of web pages, for a type of content viewed, and for viewing that is for personal purposes. In addition, time limits may be set by day, week, month, or other period. Timer controller 62 preferably implements multiple counters for monitoring the multiple types of set time limits.

A sequence controller 64, illustrated in time controller system 60, controls accessing a time controlled sequence of web pages or web sites. A user may designate a specific set of web pages or sites to view in sequence, with time limits on viewing the entire sequence or time limits on viewing each web page or site within the sequence. A user may select for sequence controller 64 to pause the sequence if the user needs to work on other items. Further, a user may select sequence controller 64 to cycle through one of multiple user-designated sequences. Moreover, a user may select a sequence of web sites designated by an employer or other group.

With reference now to FIG. 4, a block diagram depicts a time control database in accordance with the method, system, and program of the present invention. For purposes of illustration, time control database 63 is divided into three separate databases. In alternate embodiments, time control database 63 may include alternate types of databases in alternate formats.

In the example, time control database 63 includes a bookmarked pages database 66, a user selected time database 68, and an authority selected time database 70. Bookmarked pages database 66 focuses on the specific web pages and web page content selected by a user. User selected time database 68 focuses on the overall time limits set by a user. Authority selected time database 70 focuses on the time limits set by an authority.

Referring now to FIG. 5, a block diagram illustrates a bookmarked pages database in accordance with the method, system, and program of the present invention. As depicted, a bookmarked pages database 66 includes sample entries 74. Sample entries 74 are specified according to a web page address or web page content, whether the web page is part of a sequence, user time limits, and whether the web page is work related.

As illustrated in sample entries 74, a user may specify entries according to the address or content of the web site. By specifying an address, the user may specify whether any time controls for the bookmark are for the site or for the specific page. If a user designates an address and the entire site accessible from that address, it is understood that the group of web pages forming the web site accessible from the web address are considered a part of the selection. Further, it will be understood that any advertising links selected by a user from a web page within a site and the advertising site accessed as a result of the selection, may be considered as part of the time allowed for access to the first web site. For example, the address "www.cnn.com" accesses the front page of a web site providing links to multiple web pages. A user may also specify a particular page within a web site as a bookmark.

By specifying web page content, a user is specifying a bookmark to web sites with pages focusing primarily on the content specified. A user may further specify web page addresses that meet the requirements of the content specification or may allow the time controller to determine whether a web page meets the web page content requirement. For example, if an arbitrary web page is requested by a user, the time controller requests the category assigned to the web page by a search engine. If the content category is one specified by the user, then the time controller will apply time controls to that web page according to the user specifications for that content category.

Moreover, as part of the web pages accessible by a user, the user may access an e-mail account. In the example, access to a personal mail account is specified. When specifying the time limits for accessing an e-mail account, a user may also specify time limits per e-mail, per response to e-mails, and other types of limits. In addition, similar time limits can be placed on instant messaging sessions, or any other type of communication or data accessed a network portal.

Further, as part of the web pages accessible by a user, the user may access a web page that provides access to or enhances play of a game. If a user is playing the game off-line, then a time controller operating within the gaming system monitors the time utilized and controls play. The gaming system, however, may interact with a network location at which an authority or user has set time limits. A user may specify a time limit including, but not limited to, a time limit for playing a particular type of game, a time limit for reaching a particular level of a game, a time limit for playing games per week, and other time limits as appropriate for controlling time used playing games.

In the example of sample entries 74, the first four web sites specified are included in an "A" sequence. A user may specify multiple independent sequences. Further, a single web page may be specified as part of multiple independent sequences. A web page need not be part of a sequence for time controls to apply.

In addition, as illustrated in sample entries 74, a user may designate time limits according to multiple types of criteria. As shown, one of these criteria is a limited number of minutes while the sequence is executing. Another criteria is a specified percentage of the total daily time limit or total weekly time limit. Further, a user may specify to count the time the user access a web page, but not apply any time limitations on the user.

Finally, in sample entries 74, a user may designate whether access to a particular web page is work related or not. Further, some accesses to web pages may be work related or may not be work related. For example, if a user visits a travel web site, there may be some occasions where the user is scheduling a work-related trip and other occasions where the user is scheduling a personal trip. If a web page is labeled as a "depends", then upon a user request for the web page, the user may be prompted to indicate whether that particular access will be for work-related or personal purposes. It should be noted that in addition to a user specifying whether access to a web page is work-related, an authority may also specify whether access to a web site will be considered work-related or not. For example, an employer, as an authority, may regard access to news web sites as integral to only some employees' jobs. Further, within a particular web site, such as cnn.com, some web pages, such as a financial web page, may be integral to a particular employee's job, but another web page within the site, such as an entertainment web page, may not be integral to the particular employee's job.

Preferably, a user may bookmark a list of web sites, which are selectably displayed for quick access. In the present invention, the time limits set in sample entries 74 may be displayed with the displayable bookmarks. For example, the bookmark for the cnn.com web site may include a display of the number of minutes left that day for accessing the cnn.com web site. A user preferably specifies what portions of the time limits set in sample entries 74 should be displayed with the list of bookmarked web pages. Alternatively, the database of sample entries 74 may be displayed in a selectable, user-friendly format.

With reference now to FIG. 6, a block diagram depicts a user selected time database in accordance with the method, system, and program of the present invention. As illustrated, sample user time entries 76 provide examples of types of time control data specified by a user. In the example, a user first selected the time period to regulate including, but not limited to, weekly, daily or by site settings. Next, the user selected the type of web page to regulate including, but not limited to, a sequence, personal use related, news related. Further, the user specified the actual time limit for the time setting and type of web page. In the example, the user specified the time limit in minutes. In alternate embodiments, the user may specify the time limit in other units including, but not limited to, seconds, minutes, hours, days, or percentage of a work day.

Specifically, in the example, the user set overall time limits to supersede the time limits specified per page. Thus, in this example, a user can control by page, day, and week, the total amount of time spent accessing web pages.

In addition, in sample user time entries 76, a user may specify an action to be taken when the amount of a time a user access web pages reaches a specified time limit. In the example, the user specifies actions including, but not limited to, providing a warning, closing the web page, or to providing the user with the option to add minutes to the time limit.

Referring now to FIG. 7, a block diagram illustrates an authority selected time database in accordance with the method, system, and program of the present invention. As depicted, sample authority time entries 78 provides examples of types of time control data provided by an authority. The authority may specify time control data for all employees, a specific employee, or a group of employees. In the example, the authority specifies the time setting, the type of web pages, the time limit, and the action to take when the time limit is reached. In particular, the authority's time limits may override any time limits set by an user. Further, in particular, the authority may select to block a user's access to all non-work-related web pages once the user's personal accesses exceed the time limit for the week. As described in FIG. 5, an employer who is an authority may designate whether web pages and content are considered work related. In this embodiment, the employer represents an authority with control over the network access of a user. In alternate embodiments, other types of authorities may specify time limits. Another type of authority may include a parent or ISP, for example.

As another time limit option, an authority may allow a user to bank unused time. For example, if a user does not use the authorized amount of time allowed for the week, then the user may bank that time for another week's use. In particular, when employees are working towards a deadline, the time allowed for web surfing by an employer may not be utilized. When the deadlines is completed, however, the employer may reward the employee with additional time to surf the web from the unused banked time.

Figure 8:
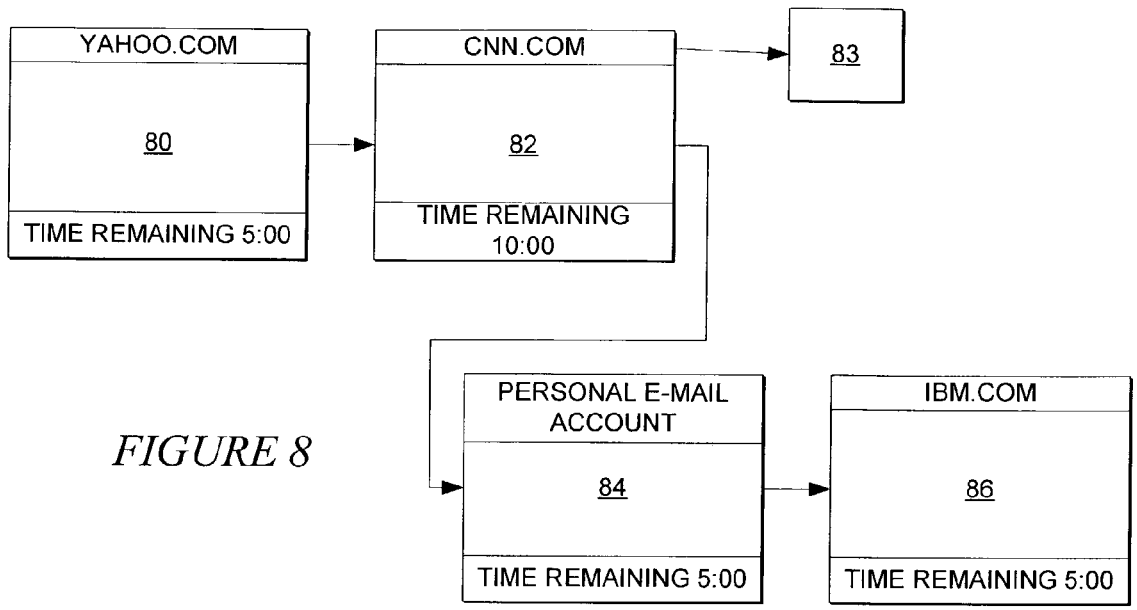
FIG. 8 depicts a block diagram of the display of a sequence of bookmarked web pages in accordance with the method, system, and program of the present invention.

With reference now to FIG. 8, a block diagram depicts the display of a sequence of bookmarked web pages in accordance with the method, system, and program of the present invention. In response to an initiation of a sequence, the web pages designated in the "A" sequence in FIG. 5 are displayed for a controlled amount of time by a sequence controller. As illustrated, the "yahoo.com" web page 80 is displayed for a maximum of five minutes. After web page 80, the sequence controller accesses and displays web pages 82, 84, and 86 for a maximum of ten minutes, five minutes, and five minutes, respectively. A user may select to advance to the next web page or may wait for the time to expire and the sequence controller to automatically initiate access to the next web page. If, for example, when the sequence accesses web page 82, a user selects from web page 82 to access a linked web page 83, then the time spent viewing web page 83 is counted in the time limit for viewing web page 82. In addition, while the sequence is playing, when the time limit for viewing web page 82 is reached, regardless of what page a user is viewing, the sequence controller accesses and displays web page 84. It will be understood that user may also override a time limit and view a web page longer than the allotted time. The user may request that the time allowed to view other web pages be adjusted. In addition, the user may set aside an amount of time each day or week to supplement the time limits when the user needs to override time limits. Further, an authority may choose not to impose a time limit for a particular access or may designate a particular access as work-related and therefore not constrained by a time limit.

Figure 9:
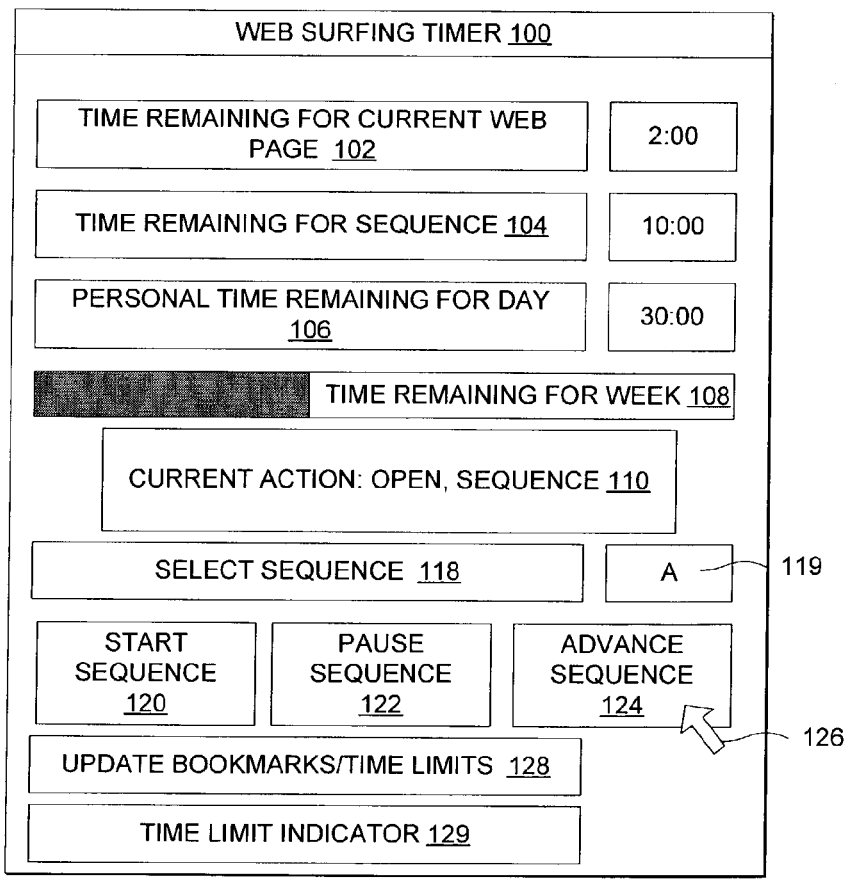
FIG. 9 depicts an illustrative representation of a time for display in accordance with the method, system, and program of the present invention.

Referring now to FIG. 9, an illustrative representation illustrates a time for display in accordance with the method, system, and program of the present invention. As depicted, a web surfing timer 100 includes multiple fields for display of timing information and multiple selectable objects for providing inputs. It will be understood that the current display of fields and selectable objects is merely illustrative. These elements and others may be positioned within a display interface or other output interface in alternate formats.

In particular, through control of a cursor control device, a user may position a cursor 126 in reference to a selectable object within the display of web surfing timer 100 and then provide another input that causes a selection of the referenced selectable object. For example, in response to a user selection of the select sequence button object 118, the user is prompted to select from among multiple available sequences. Field 119 shows the currently selected sequence. Further, a user may select to start, pause, or advance the play of a sequence by selecting, respectively from start sequence object 120, pause sequence object 122, or advance sequence object 124. Also, in response to a selection of object 128, a user initiates a function to update bookmarks and time limits.

Web surfing timer 100 also informs the user of current times remaining. Multiple counters may be implemented for counting each of the multiple time limits. For example, field 102 indicates the time remaining for viewing the current web page, field 104 indicates the time remaining for the sequence, and field 106 indicates the total personal time remaining for the day. Further, in alternate embodiments, web surfing timer 100 may inform the user of other time limitations, such as the total time remaining for the week.

In the example, the time remaining for fields 102, 104 and 106 is depicted in minutes. In alternate embodiments, web surfing timer 100 may implement other time units. Further, graphical elements may be implemented to illustrate time remaining. For example, graphical bar 108 indicates the time remaining for the week by increasing the shaded area within the bar to indicate the amount of time used. In alternate embodiments, alternate types of graphical, audio, video, and other output media may be utilized.

In addition, web surfing timer 100 informs the user of any current actions taken and the reason for the current action. In the example, a current actions field 110 indicates that the current action is that a web page is open and a sequence is playing. In alternate embodiments, the current action may be represented by a graphical element. A current action may include an indicator that a time limit has expired or is about to expire. A time limit indicator 129 may be displayed within web surfing timer 100 or another display window. Other types of indicators may also be implemented, such as a sound or output in some other manner to alert the user that a time limit has expired or is about to expire. The user may choose to ignore or delay the indicator by a keypad, voice, or other type of input. In the example, if the user clicks on time limit indicator 129, then the indicator will be removed from display.

Figure 10:
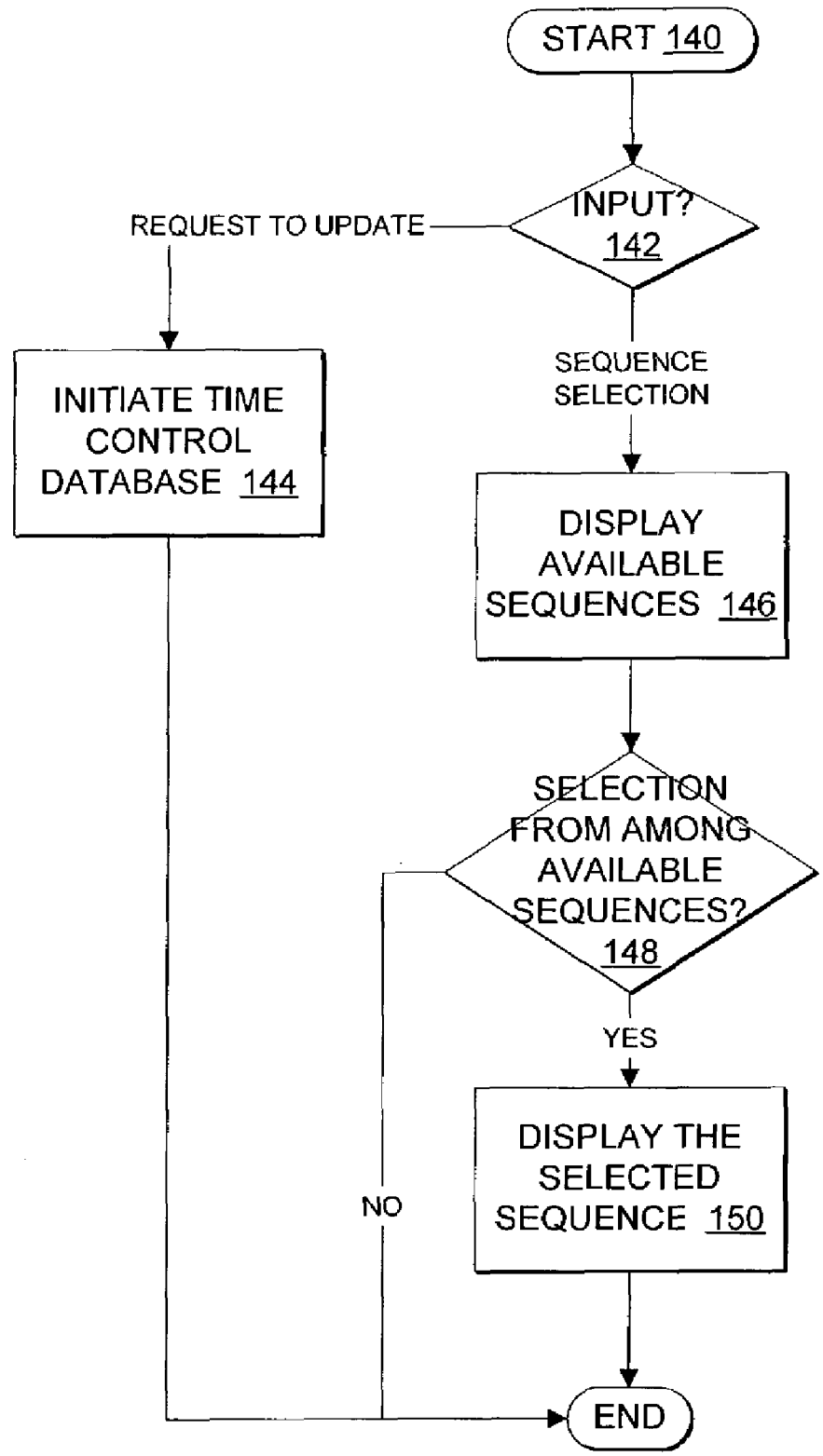
FIG. 10 depicts a high level logic flowchart of a process and program for adjusting timer preferences in accordance with the method, system, and program of the present invention.

With reference now to FIG. 10, a high level logic flowchart illustrates a process and program for adjusting timer preferences in accordance with the method, system, and program of the present invention. As depicted, the process starts at block 140 and thereafter block 142. Block 142 illustrates determining what input was received. If a request to update time limit preferences is received, then the process passes to block 144. Block 144 depicts initiating the time control database for the user to update bookmark and time control preferences. If a sequence selection is received, then the process passes to block 146. Block 146 illustrates displaying the available sequences. Next, block 148 depicts a determination whether a user selects from among the available sequences. If a user does not select from among the available sequences, then the process ends. If a user does select from among the available sequences, then the process passes to block 150. Block 150 illustrates displaying the selected sequence, and the process ends. A user may provide another input that selects to play of the displayed sequence.

Figure 11:
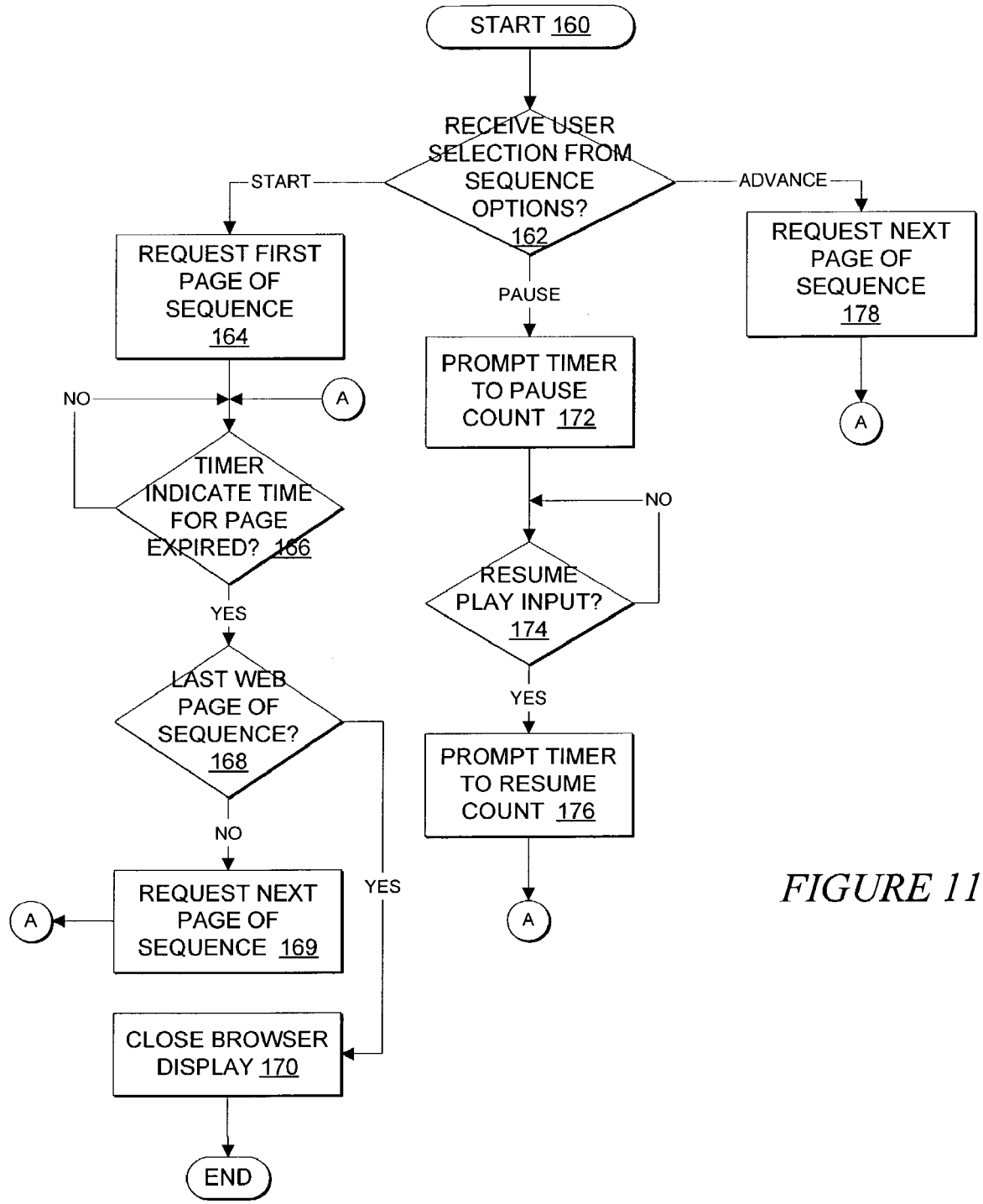
FIG. 11 depicts a high level logic flowchart of a process and program for controlling a sequence in accordance with the method, system, and program of the present invention.

Referring now to FIG. 11, a high level logic flowchart depicts a process and program for controlling a sequence in accordance with the method, system, and program of the present invention. As illustrated, the process starts at block 160 and thereafter block 162. Block 162 depicts a determination whether the user selects from the sequence play options. If the user selects to start the selected sequence, then the process passes to block 164. If the user selects to pause the selected sequence, then the process passes to block 172. If the user selects to advance the sequence, then the process passes to block 178.

Block 164 depicts requesting the first page of the sequence. In particular, the sequence controller initiates the request to access the web page of the first page of the sequence. Next, block 166 illustrates determining whether the timer indicates the time for the page expired. If the timer indicates the time for the page expired, then the process passes to block 168; otherwise the process iterates at block 166. Block 168 depicts determining whether the time has expired for the last page of the sequence. If the time has expired for the last page of the sequence, then the process passes to block 170 which illustrates closing the browser display or terminating the sequence a user selected manner, and the process ends. If the time has not expired on the last page of the sequence, then the process passes to block 169 which illustrates requesting the next page of the sequence. Thereafter, the process passes to block 166. It should be noted that a user may override the time allowed for each page of the sequence. If a user overrides the time allowed for a page of the sequence, then the time allowed for viewing other pages in the sequence may also be adjusted to compensate for the additional time. As an alternative to automatically moving to the next page of a sequence, a user may be prompted with an indicator that the time limit has expired. An indicator may include, for example, a display, a sound, or other output selected by the user or an authority. A user may select to ignore or delay such an indicator, at which time the indicator no longer output.

Block 172 depicts prompting the timer controller to pause the time count for the current web page. Next, block 174 illustrates determining whether the user has requested to resume play. If the user has not requested to resume play, then the process iterate at block 174. If the user has requested to resume play, then the process passes to block 176. Block 176 depicts prompting the timer to resume the time count for the web page, and the process ends.

Block 178 illustrates requesting the next page of the sequence, and the process passes to block 166. In particular, the timer controller will detect when a new page is requested by a user and stop counting time for the previous page.

Figure 12:
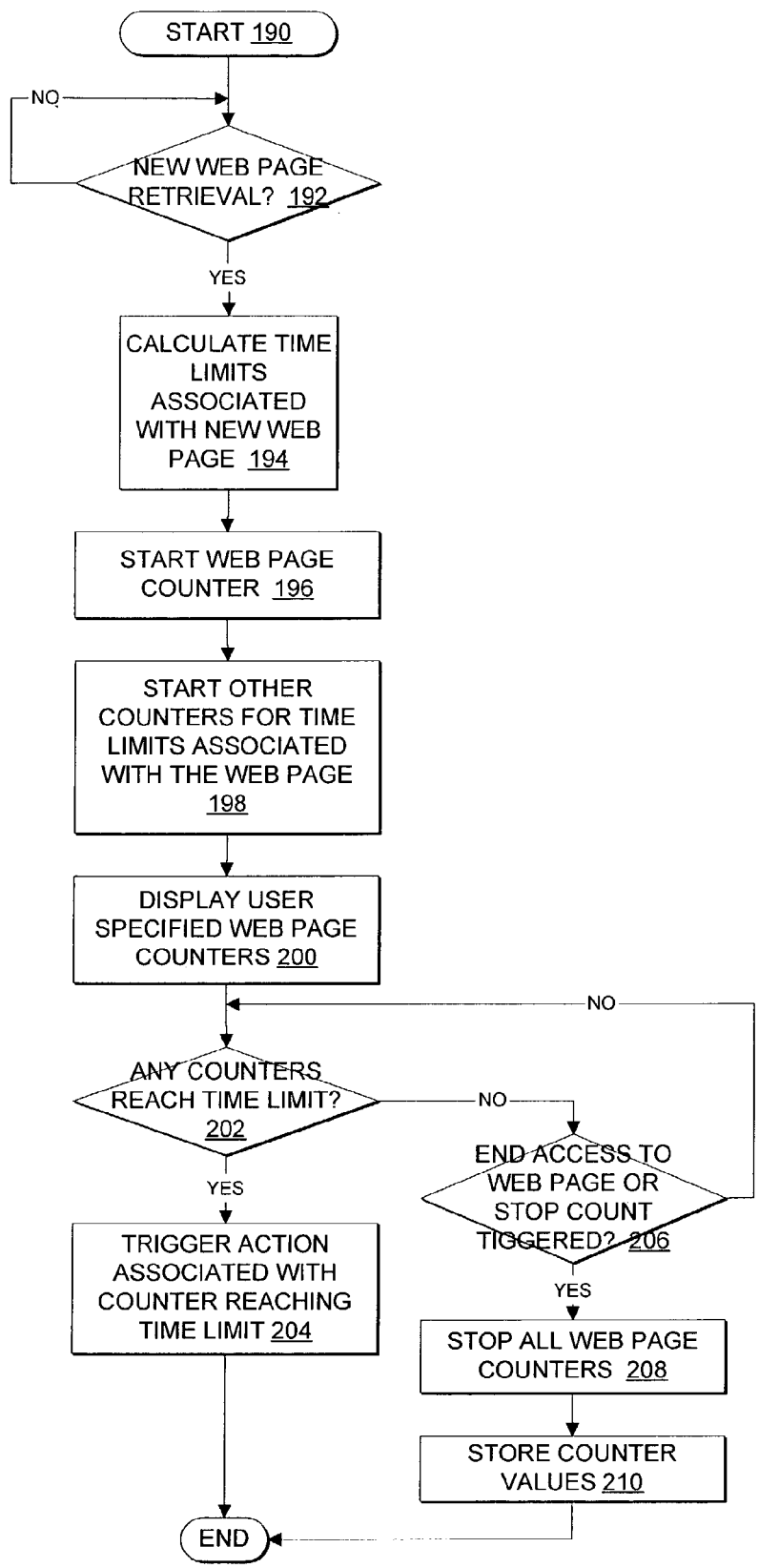
FIG. 12 depicts a high level logic flowchart of a process and program for controlling web page timers in accordance with the method, system, and program of the present invention.

With reference now to FIG. 12, a high level logic flowchart illustrates a process and program for controlling web page timers in accordance with the method, system, and program of the present invention. As depicted, the process starts at block 190 and thereafter proceeds to block 192. Block 192 illustrates determining whether a new web page is retrieved. If a new web page is not retrieved, then the process iterates at block 192. If a new web page is retrieved, then the process passes to block 194. Block 194 depicts calculating the time limits associated with the new web page. For example, the time limits associated with a new web page may include, but are not limited to, the time limit for the web site associated with the web page, the general time limit per web page, the time limit for personal web page accesses if the web page is labeled personal, the time limits associated with a sequence the new web page may be part of, or the time limits for a day, week, or other time period.

Next, block 196 illustrates starting the counter to count the time spent accessing the new web page. Thereafter, block 198 depicts starting other counters for the time limits calculated in association with the new web page. Block 200 illustrates displaying user specified web page counters, and the process passes to block 202. In particular, a user may select to only view a portion of the counters started for the web page. Further, in displaying the user specified web page counters, graphical elements may be implemented and a user may request to view an amount of time remaining rather than an amount of time used.

Block 202 depicts determining whether any counters have reached the associated time limits. If a counter reaches an associated time limit, then the process passes to block 204. Block 204 illustrates triggering an action associated with the counter reaching the associated time limit, and the process ends. An action might include, but is not limited to, closing a window, triggering the sequence controller to advance to the next web page in the sequence, closing network access, controlling output of an indicator that a time limit has expired, and other actions that are user or authority specified. A user may elect to ignore or delay an indicator, at which time the indicator is no longer output.

Returning to block 202, if no counters have reached the associated time limits, then the process passes to block 206. Block 206 illustrates determining whether a user has selected to end access to a web page by closing a window, requesting a new web page, or selecting a stop count button. If access has not ended, then the process returns to block 202. If access has ended, then the process passes to block 208. Block 208 illustrates stopping all the web page counters. In addition, block 210 depicts storing the updated counter values, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for managing a browsing session for accessing at least one web site via a network, comprising:

enabling a user to set in association with each bookmarked website from among a plurality of bookmarked websites stored in a bookmark database at least one separate time limit and at least one sequence of specified bookmarked websites to which each bookmarked website is ordered, wherein each at least one separate time limit comprises a percentage of time allowed for accessing the associated bookmarked website from a total time allowed for browsing websites for a day or week and a separate time allowed for accessing the associated bookmarked website as part of accessing a separate specified sequence of selected bookmarked websites from among the plurality of bookmarked websites;

displaying a selectable list of at least a selection of the plurality of bookmarked websites within a display interface;

responsive to detecting the user select for at least one browser to access a particular bookmarked website from the selectable list, prompting a user in a separate display interface to select whether the requested access is for one of a work purpose and a personal purpose;

responsive to a user selecting a personal purpose, reducing a total personal time allowed for personal purpose accesses by the amount of time the browser accesses the particular web page;

responsive to a user selecting a work purpose, reducing a total work time allowed for work purpose accesses by the amount of time the browser accesses the particular web page;

calculating at least one time parameter for the particular bookmarked website based on a particular at least one time limit associated with the particular bookmarked website in the bookmark database;

monitoring, by the timer controller, a total amount of time the at least one browser accesses websites for the day or week;

monitoring, by the timer controller, an amount of time the at least one browser accesses the particular bookmarked web site;

monitoring, by the timer controller, an amount of time the at least one browser accesses websites within a particular sequence of specified bookmarked websites comprising the particular bookmarked website;

responsive to the timer controller detecting that the percentage of time the at least one browser accesses the particular bookmarked website from among the total amount of time the browser accesses websites for the day or week is greater than the at least one time parameter calculated for the particular bookmarked website or the timer controller detecting the total personal time or total work time are exceeded, performing an action triggered by exceeding an allowed time for access to the particular website to provide an indicator that an allowed time has been exceeded; and responsive to the timer controller detecting the time the at least one browser accesses the particular bookmarked website from among the total time accessing websites within the particular specified sequence is greater than the at least one time parameter calculated for the particular bookmarked website, automatically directing the at least one browser to advance to a next website address in the particular specified sequence.

2. A system for managing a browsing session for accessing at least one web site in a network, comprising:

a data processing system for accessing the network;

the data processing system further comprising:

means for enabling a user to set in association with each bookmarked website from among a plurality of bookmarked websites stored in a bookmark database at least one separate time limit and at least one sequence of specified bookmarked websites to which each bookmarked website is ordered, wherein each at least one separate time limit comprises a percentage of time allowed for accessing the associated bookmarked website from a total time allowed for browsing websites for a day or week and a separate time allowed for accessing the associated bookmarked website as part of accessing a separate specified sequence of selected bookmarked websites from among the plurality of bookmarked websites;

means, responsive to detecting the user select for at least one browser to access a particular bookmarked website from the selectable list, for prompting a user in a separate display interface to select whether the requested access is for one of a work purpose and a personal purpose;

means, responsive to a user selecting a personal purpose, for reducing a total personal time allowed for personal purpose accesses by the amount of time the browser accesses the particular web page;

means, responsive to a user selecting a work purpose, for reducing a total work time allowed for work purpose accesses by the amount of time the browser accesses the particular web page;

means for calculating at least one time parameter for the particular bookmarked website based on a particular at least one time limit associated with the particular bookmarked website in the bookmark database;

means for monitoring a total amount of time the at least one browser accesses websites for the day or week;

means for monitoring an amount of time the at least one browser accesses the particular bookmarked web site;

means for monitoring an amount of time the at least one browser accesses websites within a particular sequence of specified bookmarked websites comprising the particular bookmarked website;

means, responsive to detecting that the percentage of time the at least one browser accesses the particular bookmarked website from among the total amount of time the browser accesses websites for the day or week is greater than the at least one time parameter calculated for the particular bookmarked website or the timer controller detecting the total personal time or total work time are exceeded, for performing an action triggered by exceeding an allowed time for access to the particular website to provide an indicator that an allowed time has been exceeded; and means, responsive to the detecting the time the at least one browser accesses the particular bookmarked website from among the total time accessing websites within the particular specified sequence is greatere than the at least one time parameter calculated for the particular bookmarked website, for automatically directing the at least one browser to advance to a next website address in the particular specified sequence.

3. The method according to claim 1, further comprising:

calculating by the timer controller a remaining amount of time for accessing the particular bookmarked website before exceeding the at least one time parameter for the particular bookmarked website; and updating by the timer controller a particular listing for the particular bookmarked website within the selectable list with the remaining amount of time.

4. The method according to claim 1, wherein performing an action triggered by exceeding an allowed time for access to the particular bookmarked website further comprises:

automatically closing a window of the browser displaying said particular bookmarked website.

5. The method according to claim 1, wherein performing an action triggered by exceeding an allowed time for access to the particular bookmarked website further comprises:

blocking the browser from accessing the particular bookmarked website.

6. The method according to claim 1, wherein enabling a user to set in association with each bookmarked website from among a plurality of bookmarked websites stored in a bookmark database at least one separate time limit and at least one sequence of specified bookmarked websites to which each bookmarked website is ordered further comprises:

enabling the user to set in association with at least one bookmarked electronic mail account from among a plurality of bookmarked websites stored in the bookmark database at least one time limit for monitored accesses by the timer controller to each separate electronic message accessible via the at least one bookmarked email account.

7. The method according to claim 1, wherein enabling a user to set in association with each bookmarked website from among a plurality of bookmarked websites stored in a bookmark database at least one separate time limit and at least one sequence of specified bookmarked websites to which each bookmarked website is ordered further comprises:

enabling the user to set in association with at least one bookmarked type of website content from among a plurality of bookmarked websites stored in the bookmark database at least one time limit for monitored accesses by the timer controller to at least one website comprising the bookmarked type of website content.

8. The system according to claim 2, the data processing system further comprising:

means for calculating a remaining amount of time for accessing the particular bookmarked website before exceeding the at least one time parameter for the particular bookmarked website; and means for updating by the timer controller a particular listing for said particular bookmarked website within the selectable list with the remaining amount of time.

9. The system according to claim 2, wherein the means for performing an action triggered by exceeding an allowed time for access to the particular bookmarked website further comprises:

means for automatically closing a window of the browser displaying said particular bookmarked website.

10. The system according to claim 2, wherein the means for performing an action triggered by exceeding an allowed time for access to the particular bookmarked website further comprises:

means for blocking the browser from accessing the particular bookmarked website.

11. The system according to claim 2, wherein the means for enabling a user to set in association with each bookmarked website from among a plurality of bookmarked websites stored in a bookmark database at least one separate time limit and at least one sequence of specified bookmarked websites to which each bookmarked website is ordered comprises:

means for enabling the user to set in association with at least one bookmarked electronic mail account from among a plurality of bookmarked websites stored in the bookmark database at least one time limit for monitored accesses by the timer controller to each separate electronic message accessible via the at least one bookmarked email account.

12. The system according to claim 2, wherein the means for enabling a user to set in association with each bookmarked website from among a plurality of bookmarked websites stored in a bookmark database at least one separate time limit and at least one sequence of specified bookmarked websites to which each bookmarked website is ordered further comprises:

means for enabling the user to set in association with at least one bookmarked type of website content from among a plurality of bookmarked websites stored in the bookmark database at least one time limit for monitored accesses by the timer controller to at least one website comprising the bookmarked type of website content.

13. A computer program product for managing a browsing session for accessing at least one website via a network, residing on a computer readable storage medium having computer readable program code means comprising:

means for enabling a user to set in association with each bookmarked website from among a plurality of bookmarked websites stored in a bookmark database at least one separate time limit and at least one sequence of specified bookmarked websites to which each bookmarked website is ordered, wherein each at least one separate time limit comprises a percentage of time allowed for accessing the associated bookmarked website from a total time allowed for browsing websites for a day or week and a separate time allowed for accessing the associated bookmarked website as part of accessing a separate specified sequence of selected bookmarked websites from among the plurality of bookmarked websites;

means for displaying a selectable list of at least a selection of the plurality of bookmarked websites within a display interface;

means, responsive to detecting the user select for at least one browser to access a particular bookmarked website from the selectable list, for prompting a user in a separate display interface to select whether the requested access is for one of a work purpose and a personal purpose;

means, responsive to a user selecting a personal purpose, for reducing a total personal time allowed for personal purpose accesses by the amount of time the browser accesses the particular web page;

means, responsive to a user selecting a work purpose, for reducing a total work time allowed for work purpose accesses by the amount of time the browser accesses the particular web page;

means for calculating at least one time parameter for the particular bookmarked website based on a particular at least one time limit associated with the particular bookmarked website in the bookmark database;

means for monitoring, by the timer controller, a total amount of time the at least one browser accesses websites for the day or week;

means for monitoring, by the timer controller, an amount of time the at least one browser accesses the particular bookmarked web site;

means for monitoring, by the timer controller, an amount of time the at least one browser accesses websites within a particular sequence of specified bookmarked websites comprising the particular bookmarked website;

means, responsive to the timer controller detecting that the percentage of time the at least one browser accesses the particular bookmarked website from among the total amount of time the browser accesses websites for the day or week is greater than the at least one time parameter calculated for the particular bookmarked website or the timer controller detecting the total personal time or total work time are exceeded, for performing an action triggered by exceeding an allowed time for access to the particular website to provide an indicator that an allowed time has been exceeded; and means, responsive to the timer controller detectincg the time the at least one browser accesses the particular bookmarked website from among the total time accessing websites within the particular specified sequence is greater than the at least one time parameter calculated for the particular bookmarked website, for automatically directing the at least one browser to advance to a next website address in the particular specified sequence.

14. The computer program product according to claim 13, further comprising:

means for calculating by the timer controller a remaining amount of time for accessing the particular bookmarked website before exceeding the at least one time parameter for the particular bookmarked website; and means for updating by the timer controller a particular listing for said particular bookmarked website within the selectable list with the remaining amount of time.

15. The computer program product according to claim 13, wherein said means for enabling a user to set in association with each bookmarked website from among a plurality of bookmarked websites stored in a bookmark database at least one separate time limit and at least one sequence of specified bookmarked websites to which each bookmarked website is ordered further comprises:

means for enabling the user to set in association with at least one bookmarked electronic mail account from among a plurality of bookmarked websites stored in the bookmark database at least one time limit for monitored accesses by the timer controller to each separate electronic message accessible via the at least one bookmarked email account.

* * * * *